United States Patent [19]

Kosaka, deceased et al.

[11] Patent Number: 4,483,958

[45] Date of Patent: Nov. 20, 1984

[54] THERMOPLASTIC POLYMER COMPOSITIONS COMPRISING AROMATIC POLYETHER AND AN INORGANIC FILLER

[75] Inventors: Nobutoshi Kosaka, deceased, late of Kanagawa, Japan, by Nobuko Kosaka, legal representative; Shinichi Izawa, Tokyo; Jun Sugiyama, Kanagawa, both of Japan

[73] Assignee: Asahi-Dow Limited, Tokyo, Japan

[21] Appl. No.: 489,396

[22] Filed: May 4, 1983

Related U.S. Application Data

[63] Continuation of Ser. No. 139,687, Apr. 14, 1980, abandoned.

[51] Int. Cl.$^3$ .................... C08K 3/10; C08K 3/34; C08K 3/20
[52] U.S. Cl. .................... 524/409; 524/413; 524/423; 524/426; 524/430; 524/432; 524/436; 524/445; 524/447; 524/448; 524/450; 524/452; 524/456; 524/504; 524/505
[58] Field of Search ............ 524/409, 413, 423, 426, 524/430, 432, 436, 445, 447, 448, 450, 452, 456, 504, 505

[56] References Cited

U.S. PATENT DOCUMENTS

| | | | |
|---|---|---|---|
| 3,383,435 | 5/1968 | Cizek | 525/92 |
| 3,660,531 | 5/1972 | Lavchlan et al. | 525/132 |
| 3,787,532 | 1/1974 | Carmelite et al. | 525/68 |
| 3,833,687 | 9/1974 | Lee | 525/68 |
| 3,833,688 | 9/1974 | Abolins et al. | 525/68 |
| 3,835,200 | 9/1974 | Lee | 525/68 |
| 3,976,725 | 8/1976 | Lee | 525/68 |
| 4,128,602 | 12/1978 | Katchman | 525/133 |
| 4,128,603 | 12/1978 | Katchman | 525/132 |
| 4,139,574 | 2/1979 | Cooper et al. | 525/92 |
| 4,143,095 | 3/1979 | Lee | 525/71 |
| 4,166,055 | 8/1979 | Lee | 525/92 |
| 4,172,826 | 10/1979 | Haaf et al. | 525/96 |
| 4,172,929 | 10/1979 | Cooper et al. | 260/45.7 P |

FOREIGN PATENT DOCUMENTS

| | | |
|---|---|---|
| 1422208 | 1/1976 | United Kingdom . |
| 1455589 | 11/1976 | United Kingdom . |
| 1515191 | 6/1978 | United Kingdom . |
| 2003891 | 3/1979 | United Kingdom . |
| 2039495 | 8/1980 | United Kingdom . |

OTHER PUBLICATIONS

Derwent 81180/C/46 11-6-80 (DT 3015514) Asahi Dow.
Derwent 75304 4/42 (JS2108455) Asahi Dow 9-10-77.
Derwent 41215 B/22 Apr. 17, 1979 J54048852 "Decorative . . . Filler" Asahi Dow KK (ASAF).

*Primary Examiner*—Herbert J. Lilling
*Attorney, Agent, or Firm*—Armstrong, Nikaido, Marmelstein & Kubovcik

[57] ABSTRACT

A thermoplastic polymer composition having well-balanced physical properties, especially impact strength and gloss, is provided, which comprises an aromatic polyether resin, a styrene polymer and/or a rubber-enforced styrene polymer containing a cross-linked conjugated diolefin polymer in a dispersed island state, an inorganic filler, and a thermoplastic elastomer selected from styrene-conjugated diolefin copolymers and styrenic polymer grafted polyolefin.

42 Claims, No Drawings

THERMOPLASTIC POLYMER COMPOSITIONS COMPRISING AROMATIC POLYETHER AND AN INORGANIC FILLER

This application is a continuation of application Ser. No. 139,687, filed Apr. 14, 1980 and now abandoned.

This invention relates to thermoplastic polymer compositions containing inorganic fillers and having well-balanced physical properties.

Aromatic polyether resins become the object of public attention as being broadly employable plastics, due to their superior properties, such as heat resistance, electrical characteristics, mechanical strength, resistivity to hot water, and acid- and alkli-resistivities. But, the biggest weakness of the resin is its insufficient mechanical strength, particularly its impact strength, when used as engineering plastics. To overcome the weakness, a process, in which a styrene polymer is blended with the aromatic polyether resins, has been disclosed, for example, in U.S. Pat. No. 3,383,435. An attempt has been made, in general, to blend an inorganic filler with the plastics, in order to increase the tinting susceptability and to improve weatherability, heat resistance, electrical characteristics, rigidity, etc. Such kind of improvement may be also performed, by blending an inorganic filler with the aromatic polyether resins containing a rubber-enforced styrene polymer. But, the problem in this case is in the remarkable decrease of the impact strength.

Also, U.S. Pat. No. 4,166,812 discloses a composition comprised of polyphenylene ether resin, a rubber-modified polystyrene, an inorganic filler and a thermoplastic elastomer. However, a satisfactory gloss cannot be obtained with such a composition, since the thermoplastic elastomer is contained in an amount of more than 50 parts by weight based on 100 parts by weight of the inorganic filler.

The inventors have accomplished the present invention through finding out a thermoplastic polymer composition having good appearance, which is avoided from such decrease of the impact strength.

Thus, the present invention is to provide a thermoplastic polymer composition having well-balanced physical properties, which comprises:
(a) an aromatic polyether resin,
(b) a styrene polymer and/or a rubber-enforced styrene polymer containing a cross-linked conjugated diolefin polymer in a dispersed island state,
(c) an inorganic filler, and
(d) a thermoplastic elastomer selected from styrene-conjugated diolefin block copolymer and styrenic polymer grafted polyolefin, wherein the amount of the said thermoplastic elastomer is in the range of from 10 to 150 parts by weight, based on 100 parts by weight of the said inorganic filler.

The aromatic polyether resin referred to in the present invention includes various aromatic polyethers, such as polyphenylene ethers, and its styrene-grafted copolymers.

The polyphenylene ether referred to in the present invention includes the compounds represented by the general formula,

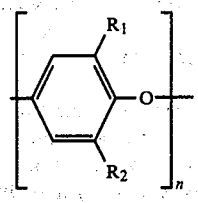

wherein $R_1$ and $R_2$ represent individually an alkyl group having 1 to 4 carbon atoms or a halogen atom, and n represents the degree of polymerization. Specific examples of the polyphenylene ethers include poly(2,6-dimethylphenylene-1,4-ether), poly(2,6-diethylphenylene-1,4-ether), poly(2-methyl-6-ethylphenylene-1,4-ether), poly(2-methyl-6-chlorophenylene-1,4-ether), poly(2,6-dichlorophenylene-1,4-ether), poly(2,6-di-n-propylphenylene-1,4-ether), poly(2-methyl-6-n-butylphenylene-1,4-ether) and poly(2-methyl-6-bromophenylene-1,4-ether).

The degree of polymerization, n, is in the range of from 50 to 300, preferably from 70 to 250.

The styrene-grafted aromatic polyether referred to herein involves the above-mentioned polyethers, particularly, polyphenylene ethers, grafted with a styrene compound, such as styrene, α-methylstyrene, dimethylstyrenes, vinyltoluenes, tert.-butylstyrenes, chlorostyrenes, and other aromatic monovinyl compounds.

The styrene compound may be used in combination with a copolymerizable vinyl compound. For example, methacrylic acid esters such as methyl methacrylate or ethyl methacrylate, acrylic acid esters such as butyl acrylate or 2-ethylhexyl acrylate, or unsaturated nitrile compounds such as acrylonitrile or methacrylonitrile can be employed. Such a copolymerizable vinyl monomer is used in an amount of 0 to 100 parts by weight, preferably 0 to 70 parts by weight based on 100 parts by weight of the styrene compound. Further, two or more styrene compounds may be used.

The amount of the styrene compound to be grafted with the aromatic polyether may be within the range of from 20 to 200 parts by weight, preferably from 25 to 170 parts by weight, based on 100 parts by weight of the polyether.

The styrene compound-grafted aromatic polyethers used in the invention may be prepared according to, for example, the processes disclosed in U.S. Pat. No. 3,929,930 and 4,097,556.

The styrene polymers as referred to in the present invention are those polymerized according to the conventional process from a styrene compound mentioned above or from a mixture of the styrene compound with a copolymerizable vinyl compound as mentioned above.

The rubber-enforced, or rubber-modified, styrene polymers mentioned in the present invention are the styrene polymers as described above, containing a cross-linked conjugated diolefin polymer, as rubber-enforcing component, in a dispersed island state. The rubber-enforced styrene polymer may be prepared by a mass polymerization process or a mass-suspension polymerization process, or an emulsion polymerization process.

The typical examples of the conjugated diolefin polymers are polybutadiene, polyisoprene, styrene-butadiene copolymer, and the like.

The rubber enforced or modified styrene polymer comprises from 55 to 97 parts by weight of the polystyrene and 3 to 45 parts by weight of the conjugated diolefinstyrene graft copolymer in a dispersed island state.

The inorganic filler mentioned in the present invention includes particulated inorganic compounds, such as titanium oxide, zinc oxide, antimony oxide, white lead, barium sulfate, magnesium hydroxide, calcium carbonate, alumina, kaolin, talc, gypsum, clay, zeolite, carbon black, diatomaceous earth, asbestos, calcium silicate, powered mica, graphite, and the like. In order to minimize the decrease of impact strength and to keep the excellent appearance, the particle size of the inorganic filler is desirably of not larger than $5\mu$.

The thermoplastic elastomer referred to in the present invention includes thermoplastic block elastomers from a conjugated diolefin and a styrene compound, and thermoplastic graft polymers from a polyolefin grafted with a styrene compound.

The thermoplastic block elastomers from a conjugated diolefin and a styrene compound, as mentioned above, have the structure represented by the following general formula, $$(A-B)_{m+1} \quad (1)$$

and/or $$B(A-B)_{m+1} \quad (2)$$

and/or $$A(B-A)_m \quad (3)$$

wherein A is a polymer block consisting of a styrene compound; B is a conjugated diolefin polymer block, and m is an integer of from 1 to 20. The styrene compound may be selected from those illustrated above. Butadiene, isoprene and the like, may be mentioned as the typical conjugated diolefin.

Preferable thermoplastic block elastomer as mentioned in the above formula include styrene-butadiene block copolymer and styrene-isoprene block copolymer, in which A/B is in the range of 50/50 to 25/75, and the molecular weights of each blocks are within the range of 5,000 to 40,000 of A and 20,000 to 200,000 of B, with the total molecular weight of 50,000 to 300,000.

The polyolefin employed for the preparation of the thermoplastic graft polymer, as mentioned above, include low density polyethylene, high density polyethylene, poly-propylene, ethylene-propylene copolymer, and copolymers of ethylene and a vinyl compound copolymerizable with ethylene. The styrene compound to be grafted to the polyolefin is preferably selected from those illustrated above. The amount of the styrene compound grafted to the polyolefin as mentioned above may be in the range from 5 to 100 parts by weight, preferably from 7 to 50 parts by weight, based on 100 parts by weight of the polyolefin.

In the present invention, the amount of the thermoplastic elastomer (d) is within the range of from 10 to 50 parts by weight, preferably from 20 to 50 parts by weight, based on 100 parts by weight of the inorganic filler (c). In case of less than 10 parts by weight of the amount, the decrease of impact strength can not be prevented. In case of higher than 50 parts by weight, gloss and feeling at the surface are deteriorated, and the apparent practicality is remarkably injured. At the amount between 20 and 50 parts by weight, a resin composition having the most superior balance of the physical properties, is attained.

In the present invention, the amount of the aromatic polyether resin (a) is preferably and practically in the range of from 40 to 90% by weight, based on the total amount of (a) and (b) components.

The amount of the inorganic filler (c) is desirably and practically within the range of from 1 to 30% by weight, based on total weight of (a), (b), (c) and (d) components.

Any method or means may be employed to blend the components which constitute the present invention. Extruder, heating rolls, Banbury mixer, kneader, etc. are generally known and equally adaptable.

It is a matter of course that the thermoplastic polymer composition according to the invention may be added with other additives, such as plasticizer, tinting agent, flame retarder, stabilizer, etc.

The plasticizer in the present invention means, in general, such additive as to improve processability and moldability of resins and to increase softness, elasticity, flexibility, etc. Exemplified are triphenyl phosphate, tricresyl phosphate, octyldiphenyl phosphate, and other phosphate esters; dioctyl phthalate, dibutyl phosphate, ethyl phthalylethyl glycolate, glycerol aliphatic carboxylates, neopentylpolyol aliphatic carboxylates, and other esters; N-ethyl-p-toluenesulfonamide, and other sulfonamides; epoxidized linseed oil, epoxidized soybean oil, epoxidized butyl stearate, and other epoxidized fatty oils; low molecular weight polyolefins, liquid paraffin, solid paraffin, microwax, and other waxes. The tinting agent means such additive as to be used for coloring of resin pellets. Exemplified are azo, phthalocyanin, and other organic pigments; oxide, sulfide, and sulfate of metals, channel black, simple elements, and other inorganic pigments; and dyestuffs.

The flame retarder used in the invention means inclusively such organic and inorganic compounds as to be added to yield incombustibility to resins. Exemplified are phosphate esters employable as plasticizer, diphenyl chloride, triphenyl chloride, chlorinated naphthalin, tetrachlorophthalic anhydride, and other chlorinated aromatic compounds; tetrabromobisphenol-A, tetrabromophthalic anhydride, decabromodiphenyl ether, and other brominated aromatic compounds; and phosphorous-containing compounds represented by the following formula,

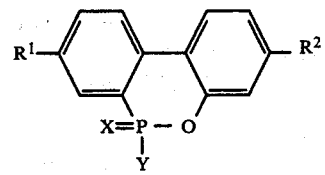

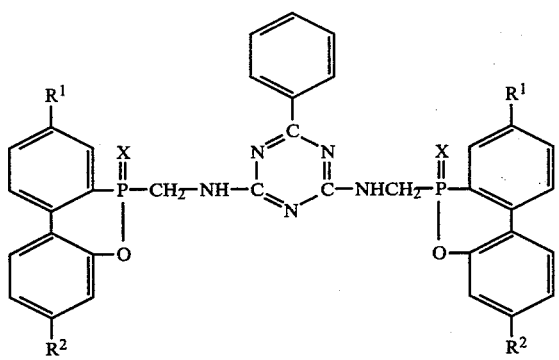

wherein X represents O or S; Y represents H, OH or $CH_3$; and $R^1$ and $R^2$, respectively, show H, Cl, Br, or alkyl radical of carbon number 1 to 4.

The stabilizer in the present invention means in general, such additive as to increase the stabilities to heat, light, oxygen, and other environmental conditions, during the molding process or usage of resins. Exemplified are barium licinolate, zinc licinolate, calcium stearate, barium stearate, zinc stearate, calcium laurate, and other metal soap type stabilizers; 2,4-bis-styrylphenol, 2,4,6-tristyrylphenol, 2,2'-methylenebis(4-methyl-6-tert.-butylphenol), and other phenol stabilizers; and benzophenone and benzotriazole light absorption agents.

The invention will more fully be described with respect to the working examples, in which all "part" and percentages are by weight.

In the examples, the impact strength means Izod impact strength according to ASTM-256, and gloss as the standard for appearance is estimated according to ASTM-523, with the results represented as gloss value.

EXAMPLE 1

A mixture of 50 parts of polyphenylene ether obtained by polymerization of 2,6-dimethylphenol and having molecular weight of 14,000, 15 parts of styrene, and 1.5 parts of di-tert.-butyl peroxide is blended by means of HENSCHEL mixer, and the mixture is treated with a twin-screw extruder at the resin temperature of 260° C. in melt-mixed state, thereby to complete the graft polymerization to form a styrene-grafted polyphenylene ether resin (as the aromatic polyether resin). A graft copolymer (as the rubber-enforced styrene polymer) is prepared by graft polymerization, in emulsion, of 60 parts of styrene onto 40 parts of polybutadiene rubber latex of 0.3μ average particle size. A mixture of 80 parts of the above mentioned aromatic polyether resin, 20 parts of the rubber-enforced styrene polymer, 5 parts of titanium oxide (0.4μ particle size), and 2 parts (corresponding to 40 parts, based on 100 parts of the inorganic filler) of styrene-butadiene block copolymer (TUFPRENE of Asahi Chemical Industry Co., Ltd.) (as the thermoplastic elastomer), is homogeneously blended by means of a blender and treated with a single-screw extruder at the cylinder temperature of 280° C., thereby to complete melt-mixing.

The thermoplastic polymer composition thus-obtained is formed to test pieces by means of a screw in-line type injection molding machine at cylinder temperature of 300° C. and mold temperature of 90° C. The physical properties of the test pieces show 17.5 Kg.cm/cm of Izod impact strength and 76 of gloss value.

REFERRING EXAMPLE

Eighty parts of the aromatic polyether resin and 20 parts of the rubber-enforced styrene polymer, the both being the same ones as employed in Example 1, are melt-mixed by means of a single-screw extruder, and formed to test pieces according to the same conditions as in Example 1. The pieces have 22.0 Kg.cm/cm of Izod impact strength and 88 of gloss value.

COMPARATIVE EXAMPLE 1

The similar thermoplastic polymer composition as in Example 1, but containing no thermoplastic elastomer, is formed to test pieces according to the similar conditions as in Example 1, having 12.6 Kg.cm/cm of Izpd impact strength and 82 of gloss value. It is obvious that the impact strength is remarkably decreased due to the inorganic filler, when compared with the result in Referring Example.

COMPARATIVE EXAMPLE 2

The similar thermoplastic polymer composition as in Example 1, excepting that the amount of the thermoplastic elastomer is 5 parts (corresponding to 100 parts, based on 100 parts of the inorganic filler), is formed to test pieces according to the similar conditions as in Example 1. The pieces show 18.3 Kg.cm/cm of Izod impact strength and 60 of gloss value.

EXAMPLE 2

A thermoplastic polymer composition, prepared from 80 parts of the aromatic polyether resin similar to that in Example 1, 20 parts of the rubber-enforced styrene polymer similar to that in Example 1, 7 parts of titanium oxide, and 3 parts of styrene-grafted ethylene-methyl methacrylate copolymer (containing 10% of methyl methacrylate and 15% of styrene), as the thermoplastic elastomer, is formed to test pieces according to the similar conditions as in Example 1. The pieces show 17.6 Kg.cm/cm of Izod impact strength and 72 of gloss value.

EXAMPLE 3

A thermoplastic polymer composition, obtained from 80 parts of the aromatic polyether resin similar to that in Example 1, 20 parts of the rubber-enforced styrene polymer similar to that in Example 1, 10 parts of zinc oxide (0.8μ particle size), and 5 parts (corresponding to 50 parts, based on 100 parts of the inorganic filler) of the thermoplastic elastomer similar to that in Example 1, is formed to test pieces according to the similar conditions as in Example 1, having 17.0 Kg.cm/cm of Izod impact strength and 68 of gloss value.

COMPARATIVE EXAMPLE 3

The similar thermoplastic polymer composition as in Example 3, but containing no thermoplastic elastomer, is formed to test pieces according to the similar conditions as in Example 1, showing 10.5 Kg.cm/cm of Izod impact strength and 75 of gloss value.

EXAMPLE 4

A thermoplastic polymer composition made from 80 parts of the aromatic polyether resin similar to that in Example 1, 20 parts of the rubber-enforced styrene polymer similar to that in Example 1, 10 parts of gypsum (5μ particle size), and 5 parts (corresponding to 50 parts, based on 100 parts of the inorganic filler) of the thermoplastic elastomer similar to that in Example 1, is formed to test pieces according to the similar conditions as in Example 1, showing 15.8 Kg.cm/cm of Izod impact strength and 55 of gloss value.

COMPARATIVE EXAMPLE 4

The similar thermoplastic polymer composition as in Example 4, but containing no thermoplastic elastomer, is formed to test pieces having 9.9 Kg.cm/cm of Izod impact strength and 70.4 of gloss value.

EXAMPLE 5

A mixture of 50 parts of a polyphenylene ether obtained from 2,6-dimethylphenol and having number average molecular weight of 12,000, 10 parts of styrene, and 0.7 part of di-tert.-butyl peroxide, is blended by means of HENSCHEL mixer, and then passed through a twin-screw extruder having 40 m/m diameter and kept at a temperature of 230° C., thereby to obtain a graft copolymer. A mixture of 45 parts of the aromatic polyether resin thus-obtained, 40 parts of rubber-enforced polystyrene (STYRON 492 of Asahi-Dow), 15 parts of the rubber-enforced styrene polymer as employed in Example 1, 10 parts of clay, and 4 parts of TUFPRENE is blended well by means of a blender, and then transferred into a single-screw extruder having 40 m/m diameter and kept at a temperature of 230° C., thereby to obtain a thermoplastic polymer composition, having 14.4 Kg.cm/cm of Izod impact strength and 62 of gloss value.

COMPARATIVE EXAMPLE 5

A mixture of 60 parts of the aromatic polyether as employed in Example 5, 40 parts of a rubber-enforced polystyrene (STYRON XH801 of Asahi-Dow), 5 parts of powdered mica, and 7 parts of a low density polyethylene grafted with 20% of styrene, is blended with a blender, and then passed through a single-screw extruder having 40 m/m diameter and kept at a temperature of 230° C., thereby to obtain a thermoplastic polymer composition, having 20.0 Kg.cm/cm of Izod impact strength and 70 of gloss value.

COMPARATIVE EXAMPLE 6

A mixture of 50 parts of a polyphenylene ether obtained from 2,6-dimethylphenol and having number average molecular weight of 11,000, 8 parts of styrene, and 0.8 part of di-tert.-butyl peroxide is blended by means of HENSCHEL mixer, and then passed through a twin-screw extruder having 40 m/m diameter and kept at a temperature of 240° C., thereby to obtain a graft copolymer. A mixture of 50 parts of the aromatic polyether resin thus-obtained, 50 parts of the rubber enforced polystyrene as employed in Comparative Example 5, 4 parts of talc, and 6 parts of TUFPRENE, is melt-kneaded, thereby to obtain a thermoplastic polymer composition, having 24.6 Kg.cm/cm of Izod impact strength and 58 of gloss value.

EXAMPLE 6

A mixture of 75 parts of the aromatic polyether resin as employed in Comparative Example 6, 25 parts of a rubber enforced polystyrene (STYRON 492 of Asahi-Dow), 8 parts of titanium oxide, 1.5 parts of TUFPRENE and 4 parts of a low molecular weight polyethylene wax, is blended by means of a blender, and then melt-kneaded by passing through a twinscrew extruder having 40 m/m diameter and kept at a temperature of 220° C., thereby to obtain a thermoplastic polymer composition, which has 16.2 Kg.cm/cm of Izod impact strength and 80 of gloss value.

COMPARATIVE EXAMPLE 7

A mixture of 50 parts of a polyphenylene ether obtained from 2,6-dimethylphenol and having number average molecular weight of 11,000, 9 parts of styrene, 5 parts of an ethylene-methyl methacrylate copolymer containing 5 mole % of methyl methacrylate, and 0.7 part of di-tert.-butyl peroxide, is blended by means of HENSCHEL mixer, and then passed through a twin-screw extruder having 40 m/m diameter and kept at a temperature of 220° C., thereby to obtain a graft copolymer. A mixture of 85 parts of the thus-obtained aromatic polyether resin, 15 parts of a rubber-enforced polystyrene polymer as employed in Example 1, 2 parts of titanium oxide, 0.2 part of carbon black, and 2 parts of styrene-butadiene-styrene type block copolymer (KRATON-1101 of Shell) is blended by means of a blender, and then passed through a single-screw extruder having 30 m/m diameter and kept at a temperature of 230° C., to obtain a thermoplastic polymer composition, having 21.6 Kg.cm/cm of Izod impact strength and 66 of gloss value.

COMPARATIVE EXAMPLES 8 to 11

In preparing the thermoplastic polymer composition in Comparative Example 7, various kinds of additives are added, prior to the treatment by the extruder having 30 m/m diameter. The results are set forth in Table 1.

TABLE 1

| Comparative Examples | Additives Kind | Amount (part) | Izod impact strength (Kg · cm/cm) | Gloss value |
|---|---|---|---|---|
| 8 | triphenyl phosphate | 8 | 16.9 | 75 |
|   | calcium stearate | 0.5 | | |
| 9 | 2,2'-methylenebis(4-methyl-6-tert.-butyl-phenol | 1.5 | 22.2 | 69 |
| 10 | mineral oil | 1.0 | 13.9 | 62 |
|    | decabromodiphenyl ether | 10.5 | | |
| 11 | low molecular weight polyethylene | 2.1 | 25.0 | 70 |
|    | Zinc sulfide | 1.4 | | |

COMPARATIVE EXAMPLE 12

A mixture of 50 parts of a polyphenylene ether obtained from 2,6-dimethylphenol and having number average molecular weight of 12,400, 8 parts of styrene, 5 parts of ethylene-propylene copolymer, and 0.6 part of di-tert.-butyl peroxide, is blended by means of HENSCHEL mixer, and then passed through a twin-screw extruder having 40 m/m diameter and kept at a temperature of 220° C., to obtain a graft copolymer. A mixture of 55 parts of the thus-obtained aromatic polyether resin, 45 parts of a rubber-enforced polystyrene (STYRON XH801 of Asahi-Dow), 30 parts of calcium silicate, 40 parts of TUFPRENE, and 5 parts of a low molecular weight polyethylene wax, is blended by means of a blender, and then passed through a single-screw extruder having 30 m/m diameter and kept at a temperature of 220° C., thereby obtained a thermoplastic polymer composition, having 13.3 Kg.cm/cm of Izod impact strength and 51 of gloss value.

EXAMPLE 7

A mixture of 65 parts of the aromatic polyether resin as employed in Comparative Example 12, 10 parts of the rubber-enforced styrene polymer as employed in Example 1, 25 parts of a rubber-enforced polystyrene (STYRON 475S of Asahi-Dow), 3 parts of titanium oxide, 1 part of TUFPRENE, and 4 parts of a phosphorous compound represented by the following formula;

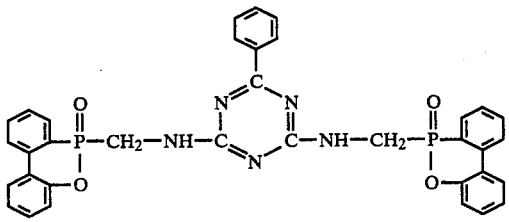

is blended by means of a blender, and then passed through a single-screw extruder having 40 m/m diameter and kept at a temperature of 230° C., thereby to obtain a thermoplastic polymer composition, having 31.0 kg.cm/cm of Izod impact strength and 83 of gloss value.

COMPARATIVE EXAMPLE 13

A mixture of 50 parts of the aromatic polyether resin as employed in Comparative Example 12, 50 parts of a rubber-enforced polystyrene (STYRON 492 of Asahi-Dow), 12 parts of asbestos, 16 parts of the low density polyethylene grafted with styrene as employed in Comparative Example 5, and 2 parts of triphenyl phosphate, is blended by means of a blender, and then passed through a twin-screw extruder having 30 m/m diameter and kept at a temperature of 210° C., thereby to obtain a thermoplastic polymer composition, having 19.2 Kg.cm/cm of Izod impact strength and 60 of gloss value.

COMPARATIVE EXAMPLE 16

A mixture of 70 parts of the aromatic polyether resin as employed in Comparative Example 12, 30 parts of a rubber-enforced polystyrene (STYRON XH801 of Asahi-Dow), 1.1 parts of carbon black, 1.5 parts of TUFPRENE, and 1.0 part of mineral oil, is blended by means of a blender, and then passed through a single-screw extruder having 30 m/m diameter and kept at a temperature of 230° C., thereby to obtain a thermoplastic polymer composition, having 24.5 Kg.cm/cm of Izod impact strength and 76 of gloss value.

EXAMPLE 9

A mixture of 50 parts of a polyphenylene ether obtained from 2,6-dimethylphenol and having number average molecular weight of 14,500, 6 parts of styrene, and 0.4 part of di-tert.-butyl peroxide, is blended by means of HENSCHEL mixer, and passed through a twin-screw extruder having 30 m/m diameter and kept at a temperature of 250° C., to obtain a graft copolymer. A mixture of 40 parts of the thus-obtained aromatic polyether resin, 60 parts of a rubber-enforced polystyrene (STYRON 470 of Asahi-Dow), 1.5 parts of titanium oxide, 0.5 part of TUFPRENE, and 4 parts of a phosphorous compound represented by the following formula;

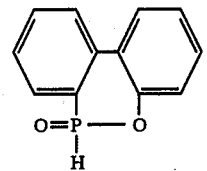

is blended by means of a blender, and passed through a single-screw extruder having 40 m/m diameter and kept at a temperature of 220° C., thereby to obtain a thermoplastic polymer composition, having 14.6 Kg.cm/cm of Izod impact strength and 88 of gloss value.

EXAMPLE 10

A mixture of 60 parts of the aromatic polyether resin as employed in Example 9, 40 parts of a rubber-enforced polystyrene (STYRON 465S of Asahi-Dow), 20 parts of talc, 7 parts of an ethylene-propyrene copolymer resin grafted with 20% by weight of styrene, and 0.3 part of Channel Black, is blended by means of a blender, and then passed through a twin-screw extruder having 40 m/m diameter and kept at a temperature of 230° C., thereby to obtain a thermoplastic polymer composition, having 16.9 Kg.cm/cm of Izod impact strength and 70 of gloss value.

EXAMPLE 11

A mixture of 90 parts of the aromatic polyether resin as employed in Example 9, 10 parts of the rubber-enforced styrene polymer as employed in Example 1, 50 parts of clay, 10 parts of TUFPRENE, 8 parts of a low molecular weight polyethylene wax, and 1 part of mineral oil, is blended by means of a blender, and then passed through a twin-screw extruder having 30 m/m diameter and kept at a temperature of 260° C., thereby to obtain a thermoplastic polymer composition, having 14.2 Kg.cm/cm of Izod impact strength and 59 of gloss value.

COMPARATIVE EXAMPLE 14

A mixture of 70 parts of a polyphenylene ether prepared from 2,6-dimethylphenol and having number average molecular weight of 13,000, and 30 parts of polystyrene (STYRON 685 of Asahi-Dow), is melt-kneaded by passing through a twin-screw extruder having 30 m/m diameter and kept at a temperature of 290° C., to obtain a graft copolymer. A mixture of 70 parts of the thus-obtained aromatic polyether resin, 30 parts of a rubber-enforced polystyrene (STYRON XH801 of Asahi-Dow), 3 parts of graphite, 4 parts of the low density polyethylene grafted with styrene as employed in Comparative Example 5, 0.5 part of mineral oil, and 0.5 part of calcium stearate, is blended by means of a blender, and then passed through a single-screw extruder having 40 m/m diameter and kept at a temperature of 240° C., thereby to obtain a thermoplastic polymer composition, having 16.8 Kg.cm/cm of Izod impact strength and 75 of gloss value.

COMPARATIVE EXAMPLE 15

A mixture of 45 parts of a polyphenylene ether obtained from 2,6-dimethylphenol and having number average molecular weight of 11,800, 55 parts of a rubber-enforced polystyrene (STYRON 475S of Asahi-Dow), 2.1 parts of powdered mica, 3 parts of TUF-PRENE, and 3 parts of triphenyl phosphate, is blended by means of a blender, and passed through a twin-screw extruder having 30 m/m diameter and kept at a temperature of 300° C., thereby to obtain a thermoplastic polymer composition, having 17.7 Kg.cm/cm of Izod impact strength and 78 of gloss value.

We claim:

1. A thermoplastic polymer composition comprising:
   (a) an aromatic polyether resin,
   (b) a styrene polymer selected from the group consisting of polystyrene, poly-α-methylstyrene, styrene-acrylonitrile copolymer, styrene-methacrylonitrile copolymer, styrene-acrylic acid copolymer, styrene-methacrylic acid copolymer, and styrene-methacrylate ester copolymer; and/or a rubber-enforced styrene polymer containing a cross-linked conjugated diolefin polymer in a dispersed island state,
   (c) an inorganic filler having an average diameter not larger than about 5 microns, and
   (d) a thermoplastic elastomer selected from the group consisting of styrene-conjugated diolefin block copolymer and styrenic grafted polyolefin,
   wherein the amount of said thermoplastic elastomer is in the range of from 10 to 50 parts by weight, based on 100 parts by weight of said inorganic filler.

2. A composition according to claim 1, wherein the said aromatic polyether resin is a polyphenylene ether.

3. A composition according to claim 1, wherein the said aromatic polyether resin is a polyphenylene ether grafted with a styrene compound.

4. A composition according to claim 3, wherein the amount of the styrene compound to be grafted with the aromatic polyether is within the range of from 20 to 200 parts by weight based on 100 parts by weight of the polyether.

5. A composition according to claim 3, wherein the amount of the styrene compound to be grafted with the aromatic polyether is within the range of from 25 to 170 parts by weight based on 100 parts by weight of the polyether.

6. A composition according to claim 2, wherein the polyphenylene ether is a polymer having the recurring unit of the formula:

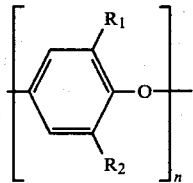

wherein $R_1$ and $R_2$ represent individually an alkyl group having 1 to 4 carbon atoms or a halogen atom, and n represents the degree of polymerization.

7. A composition according to claim 6, wherein the degree of polymerization, n, is in the range of from 50 to 300.

8. A composition according to claim 6, wherein the degree of polymerization, n, is in the range of from 70 to 250.

9. A composition according to claim 2, wherein the polyphenylene ether is a poly(2,6-dimethylphenylene-1,4-ether), poly(2,6-diethylphenylene-1,4-ether), poly(2-methyl-6-ethylphenylene-1,4-ether), poly(2-methyl-6-chlorophenylene-1,4-ether), poly(2,6-dichlorophenylene-1,4-ether), poly(2,6-di-n-propylphenylene-1,4-ether), poly(2-methyl-6-n-butylphenylene-1,4-ether) and poly(2-methyl-6-bromophenylene-1,4-ether).

10. A composition according to claim 2, wherein the polyphenylene ether is a poly(2,6-dimethylphenylene-1,4-ether).

11. A composition according to claim 1, wherein the said rubber-enforced styrene polymer comprises from 55 to 97 parts by weight of polystyrene and 3 to 45 parts by weight of a conjugated diolefin-styrene graft copolymer in dispersed island state.

12. A composition according to claim 1, wherein the said inorganic filler is selected from the group consisting of titanium oxide, zinc oxide, antimony oxide, white lead, barium sulfate, magnesium hydroxide, calcium carbonate, alumina, kaolin, talc, gypsum, clay, zeolite, carbon black, diatomaceous earth, asbestos, calcium silicate, powdered mica and graphite.

13. A composition according to claim 1, wherein the said thermoplastic elastomer is a styrene-conjugated diolefin block copolymer.

14. A composition according to claim 13, wherein the styrene-conjugated diolefin block elastomer is a block elastomer represented by the formula:

$$(A\text{---}B)_{m+1} \qquad (1)$$

and/or $$B\text{---}A\text{---}B)_{m+1} \qquad (2)$$

and/or $$A\text{---}B\text{---}A)_{m}, \qquad (3)$$

wherein A is a polymer block consisting of a styrene compound, B is a conjugated diolefin polymer block, and m is an integer from 1 to 20.

15. A composition according to claim 14, wherein the said block elastomer is a styrene-butadiene block copolymer, in which A/B is in the range of 50/50 to 25/75, and the molecular weights of each blocks are in the range of 5,000 to 40,000 of A and 20,000 to 200,000 of B, with the total molecular weight of 50,000 to 300,000.

16. A composition according to claim 1, wherein the said polyolefin is selected from the group consisting of low density polyethylene, high density polyethylene, polypropylene, ethylene-propylene copolymer, and ethylenepolymerizable vinyl compound copolymer.

17. A composition according to claim 1, wherein the amount of the styrene compound to be grafted with the polyolefin is within the range of from 5 to 100 parts by weight based on 100 parts by weight of the polyolefin.

18. A composition according to claim 1, wherein the amount of the styrene compound to be grafted with the polyolefin is within the range of from 7 to 50 parts by weight based on 100 parts by weight of the polyolefin.

19. A composition according to claim 1, wherein the amount of the said aromatic polyether resin is in the range of from 40 to 90% by weight, based on the total weight of the components (a) and (b).

20. A composition according to claim 1, wherein the amount of the said inorganic filler is in the range of from 1 to 30% by weight, based on the total weight of the components (a), (b), (c), and (d).

21. A composition according to claim 1 comprising additionally an additive, such as flame retardant, stabilizer, plasticizer and pigment.

22. A thermoplastic polymer composition consisting of:
(a) a polyphenylene ether grafted with a styrene compound,
(b) a styrene polymer and/or a rubber-enforced styrene polymer containing a cross-linked conjugated diolefin polymer in a dispersed island state,
(c) an inorganic filler having an average diameter not larger than about 5 microns,
(d) a thermoplastic elastomer selected from styrene-conjugated diolefin block copolymer and styrenic polymer grafted polyolefin, and
(e) an additive, such as flame retardant, stabilizer, plasticizer and pigment, wherein the amount of the said thermoplastic elastomer is in the range of from 10 to 50 parts by weight, based on 100 parts by weight of the said inorganic filler; the amount of the said styrenic polymer grafted polyphenylene ether is in the range of from 40 to 90% by weight, based on the total weight of the components (a) and (b); the amount of the said inorganic filler is from 1 to 30% by weight, based on the total weight of the components (a), (b), (c), and (d); and the amount of the said additive is up to 20 parts by weight, per 100 parts by weight of the components (a), (b), (c), and (d).

23. A composition according to claim 22, wherein the amount of the styrene compound to be grafted with the polyphenylene ether is within the range of from 20 to 200 parts by weight based on 100 parts by weight of the polyphenylene ether.

24. A composition according to claim 22, wherein the amount of the styrene compound to be grafted with the polyphenylene ether is within the range of from 25 to 170 parts by weight based on 100 parts by weight of the polyphenylene ether.

25. A composition according to claim 22, wherein the polyphenylene ether is a polymer having the recurring unit of the formula:

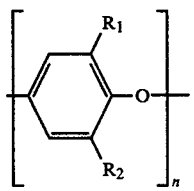

wherein $R_1$ and $R_2$ represent individually an alkyl group having 1 to 4 carbon atoms or a halogen atom, and n represents the degree of polymerization.

26. A composition according to claim 25, wherein the degree of polymerization, n, is in the range of from 50 to 300.

27. A composition according to claim 25, wherein the degree of polymerization, n, is in the range of from 70 to 250.

28. A composition according to claim 22, wherein the polyphenylene ether is a poly(2,6-dimethylphenylene-1,4-ether), poly(2,6-diethylphenylene-1,4-ether), poly(2-methyl-6-ethylphenylene-1,4-ether), poly(2-methyl-6-chlorophenylene-1,4-ether), poly(2,6-dichlorophenylene-1,4-ether), poly(2,6-di-n-propylphenylene-1,4-ether), poly(2-methyl-6-n-butylphenylene-1,4-ether) and poly(2-methyl-6-bromophenylene-1,4-ether).

29. A composition according to claim 22, wherein the polyphenylene ether is a poly(2,6-dimethylphenylene-1,4-ether).

30. A composition according to claim 22, wherein the said rubber-enforced styrene polymer comprises from 55 to 97 parts by weight of polystyrene and 3 to 45 parts by weight of a conjugated diolefin-styrene graft copolymer in dispersed island state.

31. A composition according to claim 22, wherein the said styrene polymer is selected from the group consisting of polystyrene, poly-α-methylstyrene, styrene-acrylonitrile copolymer, styrene-methacrylonitrile copolymer, styrene-acrylic acid copolymer, styrene-methacrylic acid copolymer, and styrene-methacrylate ester copolymer.

32. A composition according to claim 22, wherein the said inorganic filler is selected from the group consisting of titanium oxide, zinc oxide, antimony oxide, white lead, barium sulfate, magnesium hydroxide, calcium carbonate, alumina, kaolin, talc, gypsum, clay, zeolite, carbon black, diatomaceous earth, asbestos, calcium silicate, powdered mica and graphite.

33. A composition according to claim 22, wherein the said thermoplastic elastomer is a styrene-conjugated diolefin block copolymer.

34. A composition according to claim 33, wherein the styrene-conjugated diolefin block elastomer is a block elastomer represented by the formula:

$$(A\text{—}B)_{m+1} \tag{1}$$

and/or $$B\text{—}A\text{—}B)_{m+1} \tag{2}$$

and/or $$A\text{—}B\text{—}A)_{m}, \tag{3}$$

wherein A is a polymer block consisting of a styrene compound, B is a conjugated diolefin polymer block, and m is an integer from 1 to 20.

35. A composition according to claim 34, wherein the said block elastomer is a styrene-butadiene block copolymer, in which A/B is in the range of 50/50 to 25/75, and the molecular weights of each block are in the range of 5,000 to 40,000 of A and 20,000 to 200,000 of B, with the total molecular weight of 50,000 to 300,000.

36. A composition according to claim 22, wherein the said polyolefin is selected from the group consisting of low density polyethylene, high density polyethylene, polypropylene, ethylene-propylene copolymer, and ethylenepolymerizable vinyl compound copolymer.

37. A composition according to claim 22, wherein the amount of the styrene compound to be grafted with the polyolefin is within the range of from 5 to 100 parts by weight based on 100 parts by weight of the polyolefin.

38. A composition according to claim 22, wherein the amount of the styrene compound to be grafted with the polyolefin is within the range of from 7 to 50 parts by weight based on 100 parts by weight of the polyolefin.

39. A composition according to claim 6 wherein the polyphenylene ether is a poly(2,6-dimethylphenylene-1,4-ether), poly(2,6-diethylphenylene-1,4-ether), poly(2-methyl-6-ethylphenyl-1,4-ether), poly(2-methyl-6- chlorophenylene-1,4-ether), poly(2,6-dichlorophenylene-1,4-ether), poly(2,6-di-n-propylphenylene-1,4-ether), poly(2-methyl-6-n-butylphenylene-1,4-ether) and poly(2-methyl-6-bromophenylene-1,4-ether).

40. A composition according to claim 6 wherein the polyphenylene ether is a poly(2,6-dimethylphenylene-1,4-ether).

41. A composition according to claim 25 wherein the polyphenylene ether is a poly(2,6-dimethylphenylene-1,4-ether), poly(2,6-diethylphenylene-1,4-ether), poly(2-methyl-6-ethylphenylene-1,4-ether), poly(2-methyl-6-chlorophenylene-1,4-ether), poly(2,6-dichlorophenylene-1,4-ether), poly(2,6-di-n-propylphenylene-1,4-ether), poly(2-methyl-6-n-butylphenylene-1,4 -ether) and poly(2-methyl-6-bromophenylene-1,4-ether).

42. A composition according to claim 25 wherein the polyphenylene ether is a poly(2,6-dimethylphenylene-1,4-ether).

* * * * *